G. H. AND E. R. EBERT.
ATTACHING MEANS FOR ANTISKIDDING CHAINS.
APPLICATION FILED NOV. 18, 1920.
1,393,099.
Patented Oct. 11, 1921.
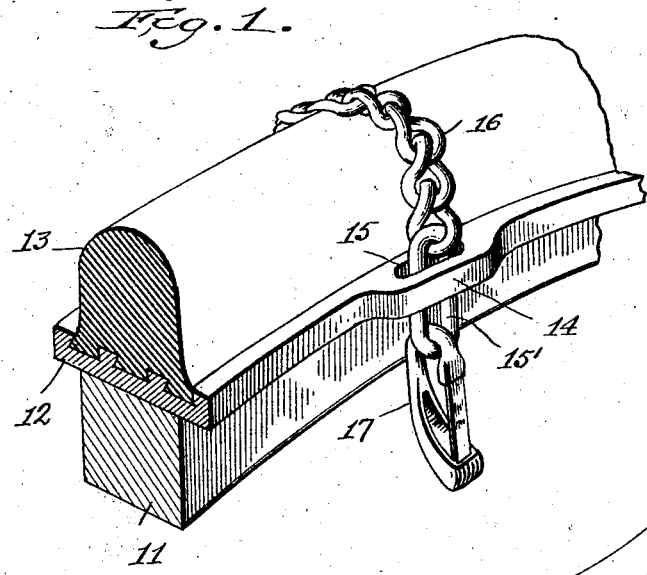
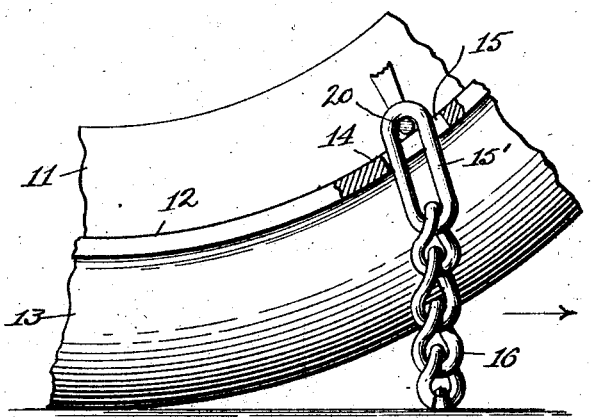
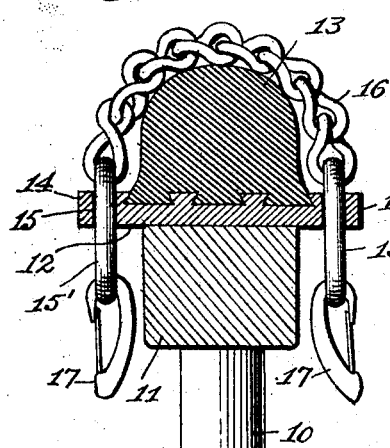
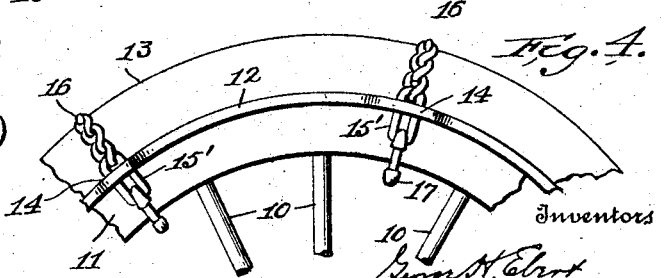
Inventors
George H. Ebert
Earnest R. Ebert
By Buckley & Swenerton
Attorneys

UNITED STATES PATENT OFFICE.

GEORGE H. EBERT AND EARNEST R. EBERT, OF BURLINGTON, IOWA.

ATTACHING MEANS FOR ANTISKIDDING CHAINS.

1,393,099.

Specification of Letters Patent.

Patented Oct. 11, 1921.

Application filed November 18, 1920. Serial No. 424,997.

*To all whom it may concern:*

Be it known that we, GEORGE H. EBERT and EARNEST R. EBERT, citizens of the United States of America, and residents of Burlington, Des Moines county, Iowa, have invented a certain new and useful Improvement in Attaching Means for Antiskidding Chains, of which the following is a specification.

Our invention relates to an improvement in attaching anti-skid means for motor vehicles, and relates particularly to a solid tire construction in which a metal rim is permanently secured to the tire. By our invention, a part of the attaching means for the anti-skidding chains forms an integral part of the metallic rim. A tire equipped with our invention can thus be applied to any truck and anti-skidding chains readily attached thereto without the provision of any special attaching means on the wheel of the truck.

Furthermore, in many trucks now on the market, there is a very small clearance between the brake-arms and the wheel, and thus it is difficult to attach the anti-skidding chains to the spokes of the wheel without causing interference with the brake-arms. By our invention, however, we are enabled to fixedly attach the chains so that they will not interfere with the brake-arms.

A particular object of this invention is to provide an attaching means which will allow a creeping of the chain-sections upon the tire for a predetermined distance, to prevent the tire from wearing away at points directly in alinement with the attaching means.

These and other features and objects of our invention will be more readily understood by having reference to the accompanying drawings, in which we have illustrated one embodiment of our invention.

Figure 1 is a detail perspective view showing a portion of a wheel with one of the anti-skid chains in position;

Fig. 2 is a side elevation of a portion of a wheel also showing the anti-skid means in position when the chain first engages the ground;

Fig. 3 is a transverse sectional view also showing the chain on the tire;

Fig. 4 is a detail side elevation showing a plurality of chains mounted on the wheel.

We have illustrated a wheel comprising spokes 10 and a felly 11, to which felly the metallic rim 12 of the tire is secured in any usual and well-known manner. This metallic rim is permanently secured to the tire, being provided with depressions into which the solid rubber tire 13 is vulcanized during the manufacture of the tire. Preferably cast integrally with the side flanges of the rim 12 are a plurality of side lugs or projections 14. These lugs are cast in pairs on opposite sides of the tire, there being preferably eight pairs of these lugs, although the number may be varied, depending upon the number of chains it is desired to attach to the wheels. Each lug is provided with an opening 15 through which the terminal links 15' of the anti-skid chains 16 are adapted to pass, a cross-head 17, preferably a snap-hook, being looped in the end of the chain to prevent the withdrawal of the terminal links from engagement with the rim.

The terminal links 15' are flat or untwisted and are relatively long compared to the links in the balance of the chain so that they can have a free in-and-out movement through the openings 15 which are slightly longer than the width of the terminal links and only wide enough to permit the terminal links to slide freely therethrough. The length of the openings being greater than the width of the terminal links permits the links to have a sidewise movement in the openings; consequently, the chains are permitted to move or creep a certain distance on the surface of the tire, which avoids the cutting of the tire, as is the case when the chains are bound tightly in one place. In the sidewise movement of the terminal links, the cross-bars or snap-hooks form a fulcrum on which they will move back and forth, as shown clearly at 20 in Fig. 2 of the drawing.

In operation, the chains on the top of the wheel will lie close upon the tire with the outer ends of the terminal links in close relation to the outer surface of the rim, as shown clearly in Fig. 1 of the drawing, and, as the wheel turns over, the terminal links slip endwisely through the openings 15, so that the inner ends thereof will lie close to the inside of the rim, as shown in Fig. 2. Thus, as each chain approaches the ground, it is lengthened considerably by the slip of the terminal links, whereby the chains will initially engage the ground an appreciable distance from the tire, and, as the wheel travels forwardly, the fulcrum point will advance ahead of the chain and cause a slight dragging operation previous to the tread of the tire engaging the chain. As the chains move upwardly from the ground, the terminal links will tend to slip inwardly to the position shown in Fig. 1 and will lie snugly on the tire. In other words, when the truck-wheels are traveling at a normal speed which is usually too slow to cause centrifugal force to throw the chains outwardly from the tires, the chains automatically lengthen as they approach the ground to provide a greater bearing surface, but automatically shorten as they approach their uppermost position, to thus prevent their striking the wheel fenders.

With this arrangement, it will be seen that we provide on the rim attaching means for anti-skid chains which are permanently carried by the tire itself and which can be provided with very slight increase in cost. A tire thus equipped can be mounted on the steel felly-band of a wheel, and the anti-skid chains then quickly and readily attached. By reason of the fact that the lugs or attaching means for the anti-skid chains are carried by the metallic rim, a minimum length of chain is required, thus minimizing the cost of these chains and likewise any danger of the spokes or felly of the wheel being chafed by contact with the chains is avoided. Likewise, the relatively long and untwisted terminal links provide a means whereby the chains are automatically lengthened and shortened, the lengthening taking place as the chains approach the ground and the shortening occurring as the chains approach their uppermost positions.

While we have illustrated and described one particular embodiment of our invention, it will of course be understood that various changes and modifications can be made without departing from the spirit and intent of our invention, within the scope of the claims herein.

The nature and scope of the invention having been thus indicated and the preferred embodiment having been specifically described, what is claimed as new is:

1. An anti-skid device comprising a chain adapted to be engaged transversely across the tire, and coöperating securing means on the chain and rim of the wheel constructed to automatically loosen and tighten the chains upon the tire as the chains approach the ground and their uppermost position, respectively, said coöperating securing means embodying terminal links which are long and straight, and openings formed radially through the rim of the wheel and in which said terminal links are secured to permit endwise movement radially of the wheel.

2. An anti-skid device comprising a chain adapted to be engaged transversely across the tire, and coöperating securing means on the chain and rim of the wheel constructed to automatically loosen and tighten the chains upon the tire as the chains approach the ground and their uppermost position, respectively, said coöperating securing means embodying openings formed radially through the rim on each side and outside of the base of the tire, terminal links on the chain mounted in said openings and having endwise movement radially of the wheel and sidewise movement in the plane of the wheel, and a fastening means engaging the ends of the terminal-links on the inside of the rim.

3. An anti-skid device comprising a metallic wheel-rim having solid permanently-fixed metal lugs substantially of the same thickness as the rim arranged in pairs and projecting from the sides forming a series of outstanding ears, a resilient tire mounted on said rim between said solid metal lugs, each of said metal lugs having an aperture extending radially and entirely through the same and lying outside of the base of the resilient tire and inside of the outer face thereof, and transverse anti-skid chains embodying relatively long terminal links adapted to extend entirely through each pair of said metal lugs while the tire is seated on the rim.

Signed at Burlington, Iowa, this 15 day of November, 1920.

GEO. H. EBERT.
EARNEST R. EBERT.